United States Patent
Li

(10) Patent No.: US 11,037,303 B2
(45) Date of Patent: Jun. 15, 2021

(54) OPTICAL FLOW BASED DETECTION AND TRACKING OF MULTIPLE MOVING OBJECTS IN SUCCESSIVE FRAMES

(71) Applicant: SONY CORPORATION, Tokyo (JP)

(72) Inventor: Pingshan Li, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 95 days.

(21) Appl. No.: 16/263,129

(22) Filed: Jan. 31, 2019

(65) Prior Publication Data

US 2020/0250832 A1 Aug. 6, 2020

(51) Int. Cl.
*G06T 7/215* (2017.01)
*G06T 7/246* (2017.01)

(52) U.S. Cl.
CPC .............. *G06T 7/215* (2017.01); *G06T 7/246* (2017.01); *G06T 2207/10016* (2013.01); *G06T 2207/20221* (2013.01); *G06T 2207/30196* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 7,801,330 B2 | 9/2010 | Zhang et al. | |
| 2008/0309516 A1* | 12/2008 | Friedrichs | G06T 7/223 340/935 |
| 2017/0083748 A1* | 3/2017 | Zhou | G06T 7/248 |
| 2018/0253848 A1* | 9/2018 | Chen | G06T 7/11 |
| 2018/0254065 A1* | 9/2018 | Chen | G11B 27/031 |
| 2018/0286199 A1* | 10/2018 | Chen | G06K 9/38 |
| 2019/0113603 A1* | 4/2019 | Wuthishuwong | G01C 21/34 |

FOREIGN PATENT DOCUMENTS

CN 105023278 A 11/2015

OTHER PUBLICATIONS

Yang, et al., "Real-time Multiple Objects Tracking with Occlusion Handling in Dynamic Scenes", 6 pages.
Akshay, et al., "Improved Multiple Object Detection and Tracking Using KF-OF Method", International Journal of Engineering and Technology (IJET), e-ISSN : 0975-4024, 7 pages.

* cited by examiner

*Primary Examiner* — Delomia L Gilliard
(74) *Attorney, Agent, or Firm* — Chip Law Group

(57) ABSTRACT

An image processing apparatus and method for detecting and tracking multiple moving objects in successive frames includes circuitry configured to detect a plurality of moving regions within a plurality of frames based on an optical flow map of a plurality of pixels within the plurality of moving regions. A plurality of merged objects are identified from the detected plurality of moving regions. A plurality of split objects are identified from the detected plurality of moving regions and the identified plurality of merged objects. A location of each of the detected plurality of moving regions, the identified plurality of merged objects and the identified plurality of split objects is predicted and tracked within the captured plurality of frames.

21 Claims, 8 Drawing Sheets

OPTICAL FLOW BASED DETECTION AND TRACKING OF MULTIPLE MOVING OBJECTS IN SUCCESSIVE FRAMES

CROSS-REFERENCE TO RELATED APPLICATIONS/INCORPORATION BY REFERENCE

None.

FIELD

Various embodiments of the disclosure relate to multiple objects detection. More specifically, various embodiments of the disclosure relate to an image processing apparatus and method for detection and tracking of multiple moving objects in an image sequence.

BACKGROUND

Recent advancements in the field of computer vision have led to the development of various techniques for multiple object detection and tracking within video feeds or successive frames of multiple objects. The detection of different moving objects in a specific video feed may be affected by noises caused by abrupt motion of objects in successive frames, merging and splitting of objects, partial or complete occlusion in a given scene, and the like. For example, in a video feed of a traffic scene captured by a traffic surveillance device, different cars may get partially or completely occluded by other cars, trucks or other bigger objects. The devices that process the video feeds may erroneously mark different cars that occlude each other as same car in subsequent frames. The detection and tracking may be more error prone when different objects may appear to merge and split or split and merge in subsequent frames from the computer vision point-of-view. Such errors are usually caused when the devices that detect and track different objects lack capability of segregation and individual level tracking of different objects in successive frames. Moreover, the motion of the objects may be unpredictable at times and the traditional detections methods may be inefficient with the detection and tracking of objects that move unpredictably in successive frames.

In certain other conventional systems, multiple cameras may be used to capture the video feed of a scene from different angles to precisely identify different objects whose region may intermittently occlude, merge, or split with regions occupied by other objects. The detection and tracking of different object by use of multiple cameras may increase the complexity of the system as well as the computational power required to detect and track different objects. Some of the conventional systems utilize appearance models, based on appearances of different objects in the video feed to detect and track different objects. However, the use of appearance models to track the occluded objects may require a large number of model parameters to estimate the appearance model, which may further escalate the computational cost, and hardware requirements. The conventional systems may be inefficient to predict an accurate position of different objects when different objects emerge after the occlusion caused by other objects.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image processing apparatus and method to detect and track multiple moving objects in successive frames is provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
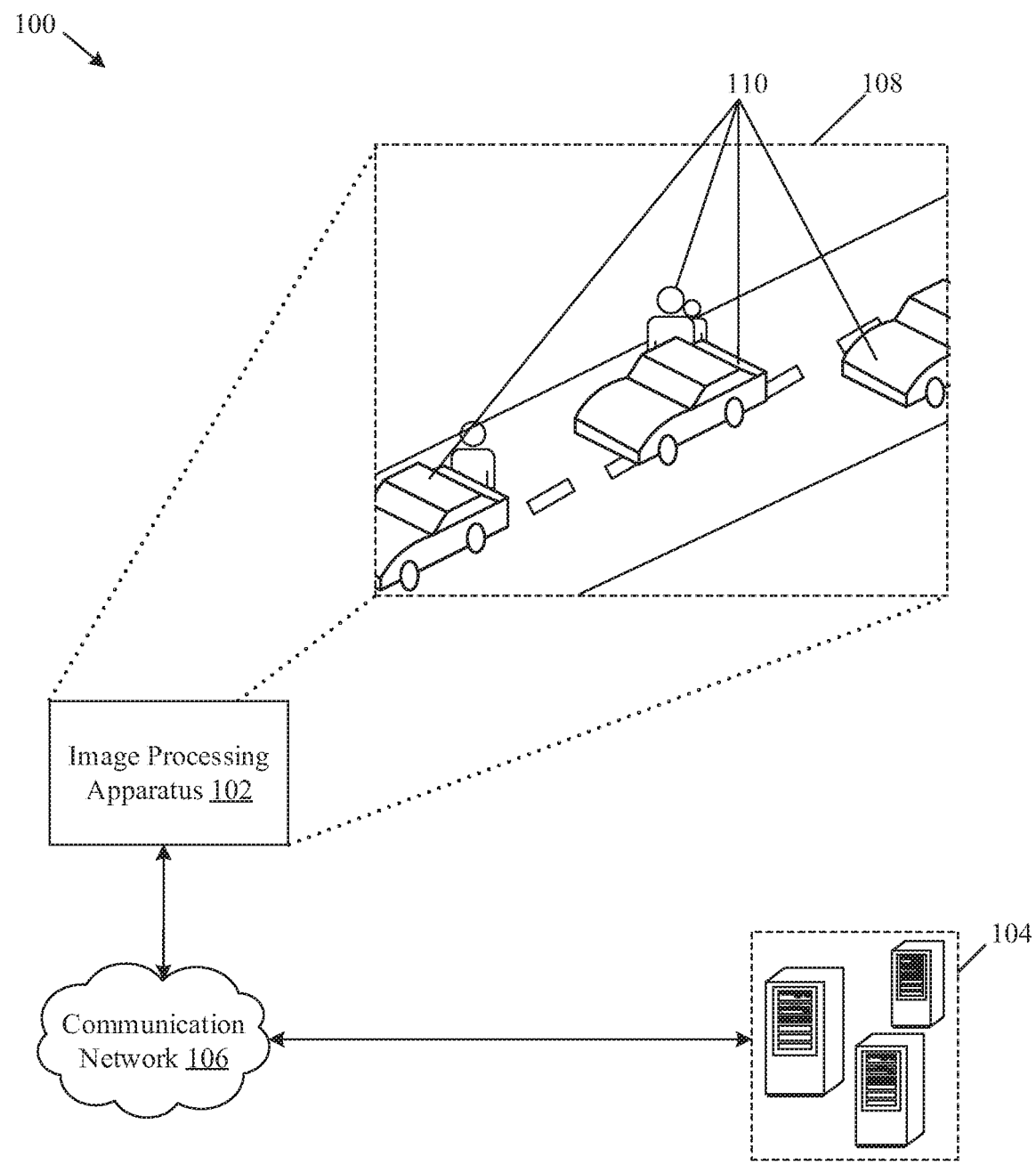
FIG. 1 is a block diagram that illustrates an exemplary network environment that facilitates detection and tracking of multiple moving objects in successive frames, in accordance with an embodiment of the disclosure.

Certain embodiments of the disclosure may be found in an image processing apparatus and method for detecting and tracking multiple moving objects in successive frames. Various embodiments of the disclosure may provide an apparatus that may include a memory device and circuitry communicatively coupled to the memory device. The circuitry may be configured to detect a plurality of moving regions within an image sequence. The detection of the plurality of objects may be based on an optical flow map of a plurality of pixels within the plurality of moving objects. The circuitry may be further configured to identify a plurality of merged objects in the plurality of moving regions.

Each of the plurality of merged objects may correspond to at least two moving objects grouped in one moving region of the plurality of moving regions. The circuitry may be further configured to identify a plurality of split objects from the plurality of moving regions and the identified plurality of merged objects. Each of the plurality of split objects may correspond to a moving object that splits from a detected moving region of the plurality of moving regions or the identified plurality of merged objects. The circuitry may be further configured to track a plurality of moving objects in the image sequence, based on a trajectory of each of the detected plurality of moving regions. Such detected plurality of moving objects may include the identified plurality of merged objects and the identified plurality of split objects.

In accordance with an embodiment, the circuitry may further include an image sensor. The circuitry may be configured to capture, by the image sensor, the image sequence that includes the plurality of moving objects and one or more occluding objects within a field-of-view of the image sensor. In accordance with an embodiment, the circuitry may be further configured to detect a plurality of moving regions in an image sequence based on an optical flow map of at least two consecutive frames of the image sequence. The optical flow map may be further generated, based on a displacement of a plurality of pixels in the at least two consecutive frames of the image sequence. In accordance with an embodiment, the circuitry may be further configured to assign a unique indicator to each of the detected plurality of moving regions in the image sequence.

In accordance with an embodiment, the circuitry may be further configured to compare a plurality of pixels of each of the detected plurality of moving regions in the at least two consecutive frames of the image sequence. At least one background region in the image sequence may be identified based on the compared plurality of pixels of each moving region of the detected plurality of moving regions in the at least two consecutive frames.

The circuitry may be further configured to monitor the at least two moving objects that remain in a first moving region for a defined number of frames. The at least two moving objects may be grouped in the first moving region of the plurality of moving regions as a first merged object based on the monitoring of the at least two moving objects that remain in a first moving region for a defined number of frames.

The circuitry may be further configured to discard each merged object from the plurality of merged objects that abruptly splits from a first moving region of the plurality of moving regions and remerges with the first moving region within a defined number of frames in the image sequence. The circuitry may be further configured to discard a first merged object identified previously in one moving region of a current frame when a size of the first merged object changes from a first size in the current frame to a second size in successive frames of the image sequence. The second size may be greater a threshold change-limit for the first merged object.

In accordance with an embodiment, the circuitry may be further configured to detect whether a first merged object identified in a first moving region of a current frame has split from the first moving region in a second frame and remerged with the first moving region in successive frames of the image sequence. The circuitry may be further configured to retain a unique indicator for a first merged object that is merged into a first moving region of the plurality of moving regions. Such retention of the unique indicator may be done when size of the first merged object may be larger than size of a second merged object that is merged into a first moving region. The circuitry may be further configured to retain a unique indicator for a first split object that is split from a first moving region of the plurality of moving regions. A new unique indicator may be assigned to a second split object that is split from the first moving region when a size of the first split object may be larger than the second split object. Therefore, when the two merged objects split from a moving region, the object which may be larger in size from the two objects, may retain the unique indicator after splitting from a moving region. The remaining object which may be split from the moving region may be assigned a new unique indicator.

In accordance with an embodiment, the circuitry may be further configured to determine a location of each of the detected plurality of moving regions, the identified plurality of merged objects and the identified plurality of split objects within a plurality of frames of the image sequence. The circuitry may be further configured to compute a velocity, an acceleration, and a centroid of each of the detected plurality of moving regions, the identified plurality of merged objects and the identified plurality of split objects within the plurality of frames of the image sequence.

In accordance with an embodiment, the circuitry may be further configured to model the trajectory of each of the detected plurality of moving regions, the identified plurality of merged objects, and the identified plurality of split objects. The trajectory may be modelled based on the computed location, the computed velocity, the computed acceleration, and the computed centroid for each of the detected plurality of moving regions, the identified plurality of merged objects, and the identified plurality of split objects. The circuitry may be further configured to model, based on a prediction filter, the trajectory of each of the detected plurality of moving regions, which may include the identified plurality of merged objects and the identified plurality of split objects for the tracking of the plurality of moving objects in the image sequence. The trajectory may be modelled further based on temporal information associated with each of the detected plurality of moving regions. The temporal information may include a location, a velocity and an acceleration, a size, and an average value of an optical flow associated with each of the detected plurality of moving regions. The detected plurality of moving regions may also include the identified plurality of merged objects and the identified plurality of split objects.

In accordance with an embodiment, the circuitry may be further configured to predict a location of the plurality of moving objects in the image sequence based on the identified plurality of merged objects and the identified plurality of split objects in the image sequence. The location of the plurality of moving objects in the image sequence may be further predicted based on the trajectory of the detected plurality of moving regions. The detected plurality of moving regions may further include the identified plurality of merged objects and the identified plurality of split objects in the image sequence. The circuitry may be further configured to measure a deviation in the predicted location from a location determined for each of the tracked plurality of moving objects. The deviation in the predicted location may be measured based on a shift of the plurality of pixels between consecutive frames of the image sequence. The predicted location may be further calibrated for each of the detected plurality of moving objects, the identified plurality of merged objects and the identified plurality of split objects. Such calibration may be done, using the circuitry, based on the measured deviation in the predicted location from a location determined for each of the tracked plurality of moving object. In accordance with an embodiment, the circuitry may be further configured to auto-focus on at least one of the tracked plurality of moving objects.

FIG. 1 is a block diagram that illustrates an exemplary network environment that facilitates detection and tracking of multiple moving objects in successive frames, in accordance with an embodiment of the disclosure. With reference to FIG. 1, there is shown a network environment 100. The network environment 100 may include an image processing apparatus 102 communicatively coupled to a server 104, via a communication network 106. In some embodiments, the image processing apparatus 102 may be utilized to capture a sequence of images of a scene (for example, a scene 108) in a field-of-view (FOV) of the image processing apparatus 102. Such scene may include a plurality of objects (for example, the plurality of objects 110) that may be in motion in successive frames of the captured sequence of images of the scene 108.

The image processing apparatus 102 may include suitable logic, circuitry, and interfaces that may be configured to detect and track a plurality of objects that may be in motion in successive frames of the captured sequence of images (hereinafter, sequence of images may be interchangeably referred to as image sequence). In some embodiments, an image sequence may be captured by an image sensor in the image processing apparatus 102, from a scene in the FOV of the image processing apparatus 102. In other embodiments, the image sequence may be retrieved from a database present on the server 104, through the communication network 106. Examples of the image processing apparatus 102 may include, but are not limited to, action cams, autofocus cams, digital cameras, camcorders, camera phones, dash cams, closed circuit television (CCTV) cams, (Internet Protocol) IP cams, reflex cams, traffic cams, projectors, web-cams, computer workstations, mainframe computers, handheld computers, cellular/mobile phones, smart appliances, video players, DVD writer/players, and smart televisions.

The server 104 may comprise suitable logic, circuitry, and interfaces that may be configured to store data and communicate with the image processing apparatus 102. The server 104 may further include a set of databases to store a set of video feeds (of sets of frames) of different scenes. In one embodiment, the computational resources required to detect and track different objects in a scene may be shared between the image processing apparatus 102 and the server 104. In another embodiment, the computational resources of the server 104 may be only utilized to detect and track different objects in a scene. Examples of the server 104 may include, but are not limited to, a web server, a database server, a file server, an application server, and a cloud server.

The communication network 106 may include a medium through which the image processing apparatus 102 may communicate with the server 104. Examples of the communication network 106 may include, but are not limited to, the Internet, a cloud network, a Long Term Evolution (LTE) network, a Wireless Local Area Network (WLAN), a Local Area Network (LAN), a Plain Old Telephone System (POTS), and a Metropolitan Area Network (MAN). Various devices in the network environment 100 may be configured to connect to the communication network 106, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols.

In operation, an image sequence may be obtained by the image processing apparatus 102. The image sequence may refer to a sequence of images that may capture a scene (for example, the scene 108) having a plurality of objects (for example, the plurality of objects 110) in motion In accordance with an embodiment, such image sequence may be obtained from an image sensor (not shown) in the image processing apparatus 102 in real time or near-real time. The image sensor may be configured to capture the image sequence of a scene (for example, the scene 108) within the FOV of the image sensor. In accordance with another embodiment, the image sequence may be obtained from a database of images or videos stored on the server 104, via the communication network 106.

Each image in the image sequence may include a foreground region and a background region. The foreground region may indicate motion of different objects collectively as a plurality of moving regions within the image sequence and the background region may include all the remnant portion of the image sequence apart from the foreground region in the image sequence. In some embodiments, the background region in each image of the image sequence may be a static background region with the foreground region associated with change in position of specific set of pixel values in successive frames of the image sequence. In other embodiments, the background region in some of the images of the image sequence may be a semi-static background region, where a portion of the background region may exhibit motion in some of the images of the image sequence. The image sequence may include the plurality of moving regions that includes at least a first portion of a plurality of objects (for example, the plurality of object 110) engaged in motion in the scene (for example, the scene 108) and a second portion occluded by different objects in the foreground region of the image sequence.

The motion of different objects of the plurality of objects may vary linearly or non-linearly based on speed of different objects in successive frames of the image sequence. In some cases, some of the objects may move abruptly in one frame to another frame of the image sequence. In accordance with an embodiment, the image processing apparatus 102 may be configured to detect and track the plurality of objects in the image sequence when the motion of the plurality of objects is linear and non-linear in successive frames of the image sequence. For example, a car that may be in motion on a busy road in a traffic signal may intermittently stop and move with linear or non-linear motion as captured in successive frames of the image sequence. In such scenarios, the image processing apparatus 102 may be configured to detect and track the motion of the car at the traffic signal.

In accordance with an embodiment, in some frames of the image sequence, the plurality of objects may be indistinguishable from other objects in the foreground region or the background region. The in-distinguishability of such plurality of objects may be based on at least one of a complete occlusion, a partial occlusion, a split from another object, a merge with other object, an abrupt instantaneous motion, abrupt scaling, deformation, artifacts, or other transformations. Therefore, in order to individually detect and track the plurality of objects that may be engaged in motion in successive frames of the image sequence, the foreground region may be detected and segregated from the background region in successive frames of the image sequence. Thereafter, different rules or filters may be applied to individually label and identify different object, associated motion and features (for example, acceleration, centroid, velocity) from the foreground region.

The image processing apparatus 102 may be configured to detect a plurality of moving regions within the captured image sequence of the scene (for example, the scene 108). Such detection of the plurality of moving regions may be done based on an optical flow map of a plurality of pixels within the plurality of moving regions of the image sequence. The optical flow map of the plurality of moving regions may be generated based on a displacement of the plurality of pixels in consecutive frames of the image sequence. The optical flow in the optical flow map may be determined based on a comparison of the plurality of pixels of each of the detected plurality of moving regions in consecutive frames of the captured image sequence. The optical flow may determine the distribution of apparent velocities of movement of pixel values in successive frames of the image sequence. Such apparent velocities may arise from either motion of the object or motion of the image processing apparatus 102, such as a camera. In some embodiments, the motion of the plurality of objects in the scene may generate the optical flow as the image processing apparatus 102 may be affixed at a specific location and the motion of the plurality of objects may be captured with respect to a stationary state of the image processing apparatus 102.

For example, an image sequence (I) may include a first frame (I1), a second frame (I2) and a third frame (I3) arranged in a sequential order. A displacement of a first region of "1000 pixels" between the first frame (I1) and the second frame (I2) may be detected as a moving region (M1) and a further displacement of a second region of 1400 pixels between the second frame (I2) and the third frame (I3) may be detected subsequently as a second moving region (M2). In some instances, a portion of the first moving region (M1) may overlap with a portion of the second moving region (M2).

The image processing apparatus 102 may be further configured to compare a plurality of pixels of each of the detected plurality of moving regions in the at least two consecutive frames of the image sequence. Such comparison may be done to identify at least one background region in the image sequence based on the compared plurality of pixels of each moving region of the detected plurality of moving regions in the at least two consecutive frames.

The image sequence may capture different objects that may translate, deform, scale in/out, rotate, or occlude behind different static or moving objects in some of the frames of the image sequence. A segregation of moving regions of interest (RoI) from static region (or background region) may be done in order to precisely detect and track different objects in motion in the image sequence. Such segregation may be done based on detection of an optical flow between at least two consecutive frames of the image sequence. Alternatively stated, a boundary condition for identification of moving region (or moving RoI) from a static (background region) may be determined from change in pixel values in a specific region in consecutive frames of the image sequence. For example, a person may bend, deform, or tilt in a scene and result in change of pixel values around a specific region of the person and a translation of a car in a traffic scene may result in a forward displacement of the pixel values. Such displacement or change may be captured through the optical flow map built from different pairs of frames in the image sequence.

The image processing apparatus 102 may further utilize the optical flow map to separate the plurality of moving regions and the non-moving regions from the image sequence. The image processing apparatus 102 may be configured to identify the background region in the captured plurality of frames based on compared plurality of pixels of each of the detected plurality of moving objects in consecutive frames.

The image processing apparatus 102 may be further configured to assign a unique indicator to each of the detected plurality of moving regions in the image sequence. Such unique indicator may be utilized to discretely identify different moving regions or provide a unique identity to each of the plurality of moving regions. In some embodiments, the unique indicator for the plurality of moving regions may be a specific color, a color gradient, or a specific color pattern. In such a case, different moving regions may be color coded with different color patterns. In other embodiments, the unique indicator for a moving region may be an identifier different from the color pattern, for example, identifiers based on alphanumeric characters or statistical parameters, such as a mean, a standard deviation, or a variance of pixel values for the moving region.

The assignment of a unique indicator to a moving region of the plurality of moving regions may facilitate detection of different objects within each of the plurality of moving regions. Alternatively stated, different objects that may be present within a single moving region may split or merge with other objects and thus, different objects may be further required to be uniquely identified within such plurality of moving regions. For example, a moving region between two frames may be given a blue color indicator. In successive frames, the blue colored moving region may split into two different objects or may merge with a different moving region.

The image processing apparatus 102 may be configured to apply a first set of conditions individually to the detected plurality of moving regions. Such first set of conditions may be utilized to identify different objects that merge with each other in successive frames of the image sequence. In one condition, the image processing apparatus 102 may be configured to identify a plurality of merged objects in the detected plurality of moving regions of the image sequence. Each of the plurality of merged objects may correspond to at least two moving objects grouped in one moving region of the detected plurality of moving regions. The image processing apparatus 102 may identify at least two moving objects as a single moving region without a separate assignment of the unique identifier to each object of the at least two moving objects. The at least two moving objects may be identified as a single moving region when the at least two moving objects cross each other and at the time of crossing one of the at least two moving objects may be occluded by other object.

In another condition, the image processing apparatus 102 may be further configured to identify the at least two objects as a single object (merged object) when the at least two objects remain in a single moving region for a defined number of frames, for example, two objects that stay in a single moving region for "10 successive frames". In yet another condition, the image processing apparatus 102 may be configured to retain a label for an object with a larger size from the at least two objects that merge in a single moving region in successive frames of the image sequence.

In yet another condition, the image processing apparatus 102 may be configured to discard an object or merge an object with other objects when the object occasionally leaves the merged region (e.g. a new object appears and then disappears after 2 frames). In yet another condition, the image processing apparatus 102 may be configured to identify a first object as part of a second object (or assigned a common unique identifier) when the first object splits from the second object. In yet another condition, the image processing apparatus 102 may be further configured to discard or merge an object that becomes very small (scales to a significantly small size) in successive frames of the image sequence. For example, a soccer ball captured in a close-up view in first few frames may scale down to an insignificant size (less than a defined size threshold) in further frames and therefore, soccer ball may be discarded from the detected plurality of objects.

The image processing apparatus 102 may be further configured to apply a second set of conditions to each of the detected plurality of moving regions. Such second set of conditions may be utilized to identify different objects that split from other objects in successive frames of the image sequence. The image processing apparatus 102 may be further configured to identify a plurality of split objects from the plurality of moving regions and the identified plurality of merged objects. Each of the plurality of split objects may correspond to a moving object that splits from a detected moving region of the plurality of moving regions or the identified plurality of merged objects. In one condition, the image processing apparatus 102 may be further configured to assign the unique identifier of the detected moving region to a largest fragment when the detected moving region splits into the larger fragment and the smaller fragment. In such condition, the smaller fragment may be assigned a unique identifier of a new object different from the unique identifier for the larger fragment.

The image processing apparatus 102 may be further configured to predict a location of each of the detected plurality of moving objects, the identified plurality of merged objects and the identified plurality of split objects within the successive frames of the image sequence. In some implementation, the prediction of the location of each of the detected plurality of moving objects, the identified plurality of merged objects and the identified plurality of split objects within the successive frames of the image sequence may be done based on different parameters specified in temporal information for a location, a velocity, an acceleration, a size, and an average value of optical flow for the detected plurality of moving regions.

A trajectory of each of the detected plurality of moving objects, the identified plurality of merged objects and the identified plurality of split objects may be modelled from the captured image sequence based on a prediction filter, for example, a Kalman Filter (or a Linear Quadratic Estimator (LQE)). Each of the detected plurality of moving objects, the identified plurality of merged objects and the identified plurality of split objects may be further tracked within the captured plurality of frames based on the modelled trajectory. Such trajectory may be modelled based on temporal information associated with each of the detected plurality of moving regions, which may include the identified plurality of merged objects and the identified plurality of split objects. The temporal information may include a location, a velocity, an acceleration, a size, and an average value of optical flow associated with each of the detected plurality of moving regions.

The image processing apparatus 102 may further utilize the prediction filter (for example the prediction filter 214 of FIG. 2), to track the identified plurality of moving objects, the identified plurality of split objects or the identified plurality of merged objects in successive frames of the image sequence. In accordance with an embodiment, the image processing apparatus 102 may further utilize the prediction filter, to predict a location of the centroid of the identified plurality of moving objects, the identified plurality of split objects or the identified plurality of merged objects that occlude each other in successive frames of the image sequence. Accordingly, such prediction may be done based on the modelled trajectory for the identified plurality of moving objects, the identified plurality of split objects or the identified plurality of merged objects.

In accordance with an embodiment, the image processing apparatus 102 may utilize the prediction filter, to further determine a size of the different objects from the identified plurality of moving objects, the identified plurality of split objects or the identified plurality of merged objects. The determination of the size may be based on an amount of shift in pixels between two consecutive frames of the image sequence. Accordingly, the image processing apparatus 102 may further utilize the prediction filter, to predict a size of the identified plurality of moving objects, the identified plurality of split objects or the identified plurality of merged objects that occlude each other in successive frames of the image sequence.

In accordance with an embodiment, the image processing apparatus 102 may further utilize the prediction filter, to further determine an average optical flow value of individual objects in the identified plurality of moving objects, the identified plurality of split objects or the identified plurality of merged objects in successive frames of the image sequence. Such average optical flow value may be determined prior to occlusion of different objects from the identified plurality of moving objects, the identified plurality of split objects or the identified plurality of merged objects. Similarly, post occlusion, the image processing apparatus 102 may utilize the prediction filter, to predict an average optical flow value for different occluded objects from the identified plurality of moving objects, the identified plurality of split objects or the identified plurality of merged objects.

In some embodiments, the image processing apparatus 102 may be further configured to check if objects that separate from other objects post occlusion are located in the predicted object location. The object that may separate from the other object post occlusion may be identified as the same object that may be detected prior to occlusion when such object is located at the predicted location. The predicted location may vary from the actual location of an identified object that reappears post the occlusion. Thus, the image processing apparatus 102 may apply a threshold deviation between the predicted location and the actual location for an object that may occlude and reappear at a specific location after the occlusion. For example, for very small differences, the object may be identified as the same object that suffered occlusion and differences greater than threshold deviation, the object that reappears post the occlusion at a different location may be identified as a new object.

It may be noted that the object detection, tracking and location prediction may be further utilized to obtain further information associated with the detected plurality of objects in the image sequence. Such information may be further utilized in different applications, for example, human-computer interactions, robotics (e.g., service robots), consumer electronics (e.g., smart-phones), security (e.g., recognition, tracking), retrieval (e.g., search engines, photo management), and transportation (e.g., autonomous and assisted driving), without a deviation from scope of the disclosure.

The image processing apparatus 102 may detect and track different occluding objects or moving objects for different applications that may further pose different requirements. The detection and tracking of different occluding or moving objects may be done with an optimal processing time, a robustness to occlusion, an invariance to rotation, a robust detection under pose change, and the like. In some cases, the detection and tracking of different objects may be further utilized to detect at least one of multiple types of objects that span different object classes (such as, humans, animals, vehicles, and the like) and a single type of object from different views (e.g., side and frontal view of vehicles).

It may be further noted that the plurality of objects (for example, the plurality of objects 110) may be detected and tracked invariant of a scale, a position, an occlusion, an illumination, and an orientation of different objects with respect to the image processing apparatus 102. The detailed operation of the image processing apparatus 102 may be further described in detail, for example, in FIG. 2, FIG. 3A, and FIG. 3B.

Figure 2:
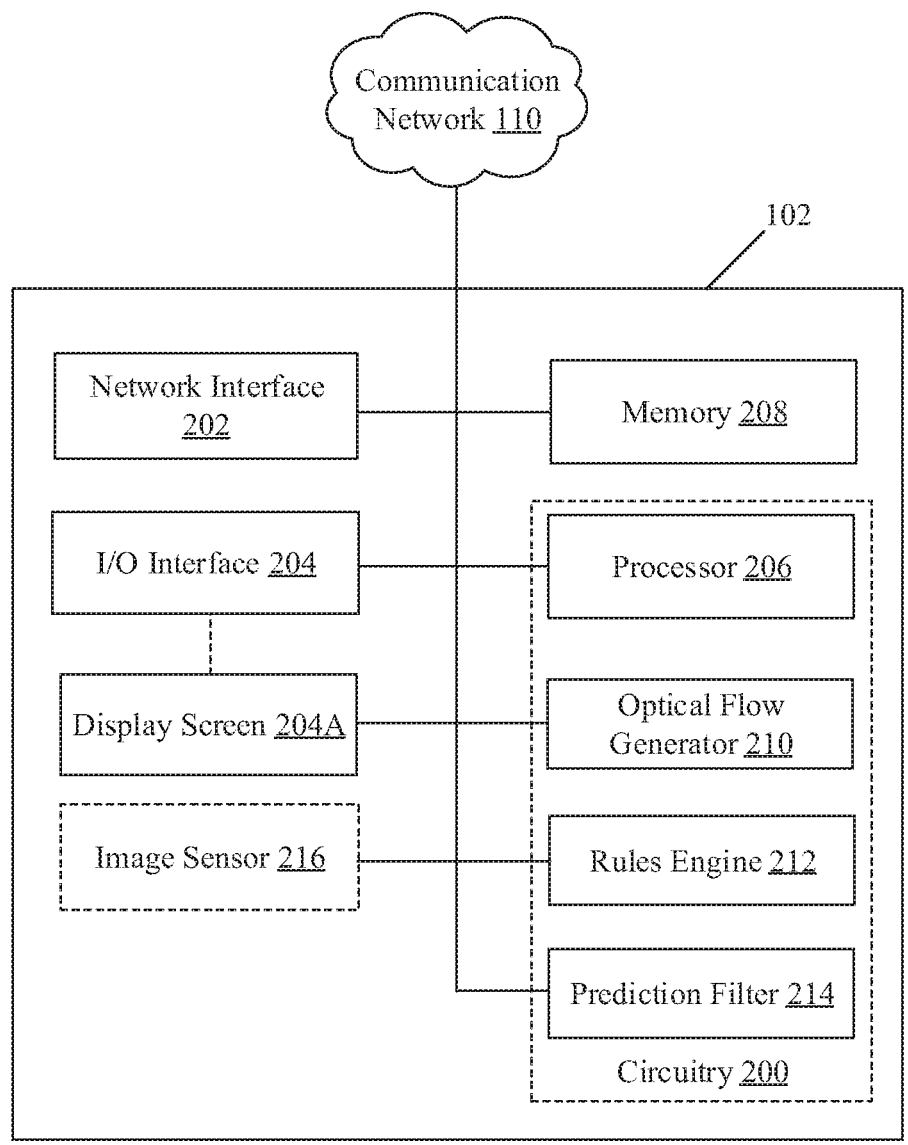
FIG. 2 is a block diagram that illustrates an exemplary image processing apparatus to detect and track multiple moving objects in successive frames, in accordance with an embodiment of the disclosure.

FIG. 2 is a block diagram that illustrates an exemplary image processing apparatus to detect and track multiple moving objects in successive frames, in accordance with an embodiment of the disclosure. With reference to FIG. 2, there is shown the image processing apparatus 102. The image processing apparatus 102 may include a network interface 202, an Input/output (I/O) interface 204, a display screen 204A, a processor 206, a memory 208, and a circuitry 200. The circuitry 200 may further include an optical flow generator 210, a rules engine 212, and a prediction filter 214 communicatively coupled to the I/O interface 204, the processor 206, and the memory 208, through communication buses/channels. In some embodiments, the image processing apparatus 102 may further include an image sensor 216 communicatively coupled to each component of the circuitry 200, the processor 206, the memory 208, and a graphical processing unit (GPU), via communication buses onboard the image processing apparatus 102.

The network interface 202 may comprise suitable logic, circuitry, and interfaces that may be configured to establish communication between the image processing apparatus 102 and the server 104, via the communication network 106. The network interface 202 may be implemented by use of various known technologies to support wired or wireless communication of the image processing apparatus 102 with the communication network 106. The network interface 202 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and a local buffer.

The network interface 202 may communicate via wireless communication with networks, such as the Internet, an Intranet and a wireless network, such as a cellular telephone network, a wireless local area network (LAN) and a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and IEEE 802.11n), voice over Internet Protocol (VoIP), light fidelity (Li-Fi), Wi-MAX, a protocol for email, instant messaging, and Short Message Service (SMS).

The I/O interface 204 may comprise suitable logic, circuitry, and interfaces that may be configured to operate as an I/O channel/interface between a user and the different operational components of the image capture apparatus. Such I/O interface 204 may facilitate an I/O device to receive an input from a user and present an output based on the provided input from the user. The I/O interface 204 may comprise various input and output ports to connect various I/O devices that may communicate with different operational components of the image processing apparatus 102. Examples of the input devices may include, but is not limited to, a touch screen, a keyboard, a mouse, a joystick, a microphone, and other image capture devices. Examples of the output devices may include, but is not limited to, a display (for example, the display screen 204A), a speaker, and a haptic or other sensory output device.

The display screen 204A may comprise suitable logic, circuitry, interfaces that may be configured to display the image sequence and a plurality of objects tracked in successive frames of the image sequence. The display screen 204A may be realized through several known technologies such as, but not limited to, at least one of a Liquid Crystal Display (LCD) display, a Light Emitting Diode (LED) display, a plasma display, and an Organic LED (OLED) display technology, and other display. In accordance with an embodiment, the display screen 204A may refer to a display screen of smart-glass device, a see-through display, a projection-based display, an electro-chromic display, and a transparent display.

The processor 206 may comprise suitable logic, circuitry, and interfaces that may be configured to execute a set of instructions stored in the memory 208. The processor 206 may be implemented based on a number of processor 206 technologies known in the art. Examples of the processor 206 may include, but are not limited to, a Graphical Processing Unit (GPU), a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor.

The memory 208 may comprise suitable logic, circuitry, and interfaces that may be configured to store a set of instructions executable by the processor 206. The memory 208 may be configured to store data associated with operating systems and associated applications. The memory 208 may be further configured to store instructions and control signal data that may be utilized to detect and track the plurality of objects engaged in motion in successive frames of the image sequence. Examples of implementation of the memory 208 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

The optical flow generator 210 may comprise suitable logic, circuitry, and interfaces that may be configured to generate, in conjunction with the processor 206, an optical flow map based on at least two successive frames in the image sequence. The optical flow generator 210 may utilize, in conjunction with the processor 206, a plurality of flow vectors of the plurality of objects captured in successive frames of the image sequence. The plurality of flow vectors may be utilized to detect a plurality of moving regions in successive frames of the image sequence. In some embodiments, the optical flow generator 210 may be implemented as a single hardware processor, a cluster of processor, or a specialized hardware circuitry (as shown) in the image processing apparatus 102. For example, the optical flow generator 210 may be implemented based on one of an x86-based processor, a RISC processor, a field programmable gate array (FPGA), an ASIC processor, a programmable logic ASIC (PL-ASIC), a CISC processor, and other hardware processors. In other embodiments, the optical flow generator 210 may be implemented as programs/instructions executable at the processor 206 that may execute the functions of the optical flow generator 210 in a sequential or parallelized executional paradigm.

The rules engine 212 may comprise suitable logic, circuitry, and interfaces that may be configured to apply a set of conditions on the detected plurality of moving region in successive frames of the image sequence. Such application of the set of conditions may be utilized to identify a plurality of moving objects, a plurality of split objects, and a plurality of merged objects. Additionally, objects that may abruptly appear and disappear or scale in/out abruptly may be discarded based on the application of the set of conditions.

The prediction filter 214 may be further configured to track each of the detected plurality of moving regions, the identified plurality of merged objects and the identified plurality of split objects in the captured image sequence. Such regions or objects may be tracked based on the modelled trajectory for the detected plurality of moving regions, the identified plurality of merged objects and the identified plurality of split objects. In accordance with an embodiment, the prediction filter 214 may be implemented as a Kalman filter. In accordance with another embodiment, the prediction filter 214 may be implemented as a Bayesian filter or a filter based on Hidden Markov Models (HMM).

The image sensor 216 may comprise suitable logic, circuitry, and interfaces that may be configured to capture an image sequence, such as a video or a sequence of images, of a scene (for example, the scene 108) visible in the FOV of the image processing apparatus 102. The image sensor 216 may capture the image sequence of images, such as the video, or the images, while the image processing apparatus 102 may be affixed to a specific location or engaged in motion. The image sensor 216 may be implemented as one of an active pixel sensor (such as a complementary metal oxide (CMOS) sensor), a passive pixel sensor (such as a charge coupled device (CCD) sensor), an oversampled binary image sensor, a planar Fourier capture array (PFCA), and a back-illuminated (BSI or BI) sensor, and the like. Although not shown, in some embodiments, the image sensor 216 may further include a specialized microprocessor (or a microcontroller), and a memory, and/or a graphic processing unit (GPU), integrated with the image sensor 216.

In operation, an image sequence of a scene may be captured by the image sensor 216 of the image processing apparatus 102 or retrieved from the server 104, via the communication network 106 and further stored in the memory 208. The processor 206 may be configured to receive control instructions to execute different operations for precise detection and tracking of multiple moving objects throughout successive frames of the image sequence.

The image sequence may include a plurality of moving regions that displace, change orientation, occlude, transform, deform, or scale in successive frames of the image sequence. Different objects may be present in the plurality of moving regions which may be grouped in one region or more than one moving region in the image sequence. Similarly, different objects may get fragmented into multiple moving regions but may be part of a single object. For example, the arms and the clothes worn by a specific person may move differently and may get fragmented into different moving regions. Further, different objects may partially or fully occlude regions of other objects in successive frames of the image sequence. The detection and tracking of different objects in aforementioned scenarios may be done based on defined set of rules for objects and objects that intermittently or permanently merge and split in successive frames of the image sequence. The occlusion may be dealt with by using motion information of the plurality of objects, assignment of unique identifiers (for example, color labels) to different objects and prediction of temporal information for uniquely identified objects.

The set of rules to identify the plurality of objects in the image sequence may be defined in the rules engine 212. Each of the plurality of merged objects may correspond to at least two moving objects grouped in one moving region of the plurality of moving regions. The processor 206 may be configured to monitor, using the rules engine 212, the at least two moving objects that remain in a first moving region for a defined number of frames, for example, "10" consecutive frames. The at least two moving objects may be grouped in the first moving region of the plurality of moving regions as a first merged object based on results obtained for the at least two moving objects. In accordance with an embodiment, the plurality of objects that remain in the same moving region for a long time (e.g. for a duration equivalent to "10 frames" in a "30 frames per second" video) may be merged into one object. For example, a person wears a hat for long time, then the person and the hat may be merged into a single object.

The processor 206 may be configured to identify, using the rules engine 212, a plurality of merged objects from the plurality of moving regions. The processor 206 may be further configured to discard, using the rules engine 212, a first merged object identified previously in one moving region of a current frame when a size of the first merged object changes from a first size in the current frame to a second size in successive frames of the image sequence. In such cases, the second size may be beyond a threshold change-limit. The processor 206 may be further configured to detect, using the rules engine 212, whether a first merged object identified in a first moving region of a current frame has split from the first moving region in a second frame and remerged with the first moving region in successive frames of the image sequence. In accordance with an embodiment, the processor 206 may be further configured to retain, using the rules engine 212, retain a unique indicator for a first merged object that merged into a first moving region of the plurality of moving regions, when size of the first merged object is larger than size of a second merged object that is merged into a first moving region.

When two objects merge, the object label for the object with larger size may be retained. One or more objects may abruptly split from a merged object in successive frames of the image sequence. Therefore, each merged object may be discarded from the plurality of merged objects that abruptly splits from a first moving region of the plurality of moving regions and remerges with the first moving region within a defined number of frames. In accordance with an embodiment, the processor 206 may be configured to discard, using the rules engine 212, each merged object from the plurality of merged objects that abruptly splits from a first moving region of the plurality of moving regions and remerges with the first moving region within the defined number of frames in the image sequence. In accordance with another embodiment, each merged object may be merged with the plurality of merged objects that may abruptly split from a moving region and remerge with the moving region within the defined number of frames in the image sequence, for example, the defined number of frames may be "2 frames" in an image sequence.

The processor 206 may be further configured to identify, using the rules engine 212, a plurality of split objects from the plurality of moving regions and the identified plurality of merged objects. Each of the plurality of split objects may correspond to a moving object that splits from a plurality of moving regions. In accordance with an embodiment, the first moving region may split into a first split object and a second split object. The number of split objects may be two or more objects. Each of the plurality of moving regions may be assigned with a unique indicator when the moving regions are detected in image capture apparatus. In accordance with an embodiment, already assigned unique indicator to the moving region may be retained by a first split object that is split from a first moving region of the plurality of moving regions. In accordance with an embodiment, the first split object may be larger in size than the second split object. A new label may be assigned to the second split object. Accordingly, when more than two objects may split, the first object may retain original label or unique indicator and the other objects may be assigned new labels/unique indicator.

The processor 206 may be configured to track, using the prediction filter 214, a plurality of objects after occlusion or after the objects cross each other, in successive frames of the image sequence. The plurality of objects may include the detected plurality of moving regions, the identified plurality of merged objects and the identified plurality of split objects. The processor 206 may be configured to predict, using the prediction filter 214, a location of each of the detected plurality of moving regions, the identified plurality of merged objects and the identified plurality of split objects within the captured image sequence.

The processor 206 may be further configured to model, using the prediction filter 214, model a trajectory of each of the detected plurality of moving regions, the identified plurality of merged objects and the identified plurality of split objects within the captured image sequence. The trajectory may be modelled on a state space model of temporal information of an estimated centroid of each of the detected plurality of moving regions, the identified plurality of merged objects and the identified plurality of split objects within the captured plurality of frames. The trajectory of each of the detected plurality of moving regions, the identified plurality of merged objects and the identified plurality of split objects may vary linearly or uniformly throughout the captured image sequence.

The temporal information may include a location, a velocity and an acceleration, a size, and an average value of optical flow of each of the detected plurality of moving regions, the identified plurality of merged objects and the identified plurality of split objects within the image sequence. The acceleration of each of the detected plurality of moving regions, the identified plurality of merged objects and the identified plurality of split objects may be constant. The prediction of the location of the object may be based on a modelled trajectory of each of the detected plurality of moving regions, the identified plurality of merged objects and the identified plurality of split objects within the captured plurality of frames.

In accordance with an embodiment, the processor 206 may be configured to track using the prediction filter 214, the plurality of objects in successive frames of the image sequence. The plurality of objects may be tracked based on determination of a location of centroid of the plurality of objects from an initial frame. Such determination of the location of centroid may be followed by a calculation of a velocity and an acceleration of the object in successive frames of the image sequence. The trajectory obtained for such an object may be a centroid trajectory. In accordance with an embodiment, the processor 206 may be configured to predict, using the prediction filter 214, the location of the centroid of the plurality of objects after occlusion based on the centroid trajectory.

In accordance with an embodiment, the processor 206 may be configured to determine, using the prediction filter 214, a size of the plurality of objects based on an amount of shift of pixels between two consecutive frames of the image sequence. The processor 206 may be further configured to predict, using the prediction filter 214, the size of the plurality of objects after occlusion caused by other objects in the image sequence. In accordance with an embodiment, the processor 206 may be configured to determine, using the prediction filter 214, an average optical flow value of each of the plurality of objects in the image sequence. The average optical flow value may be further predicted for each of the plurality of objects after occlusion caused by other objects in the image sequence. Thus, the centroid trajectory of an object, the size of an object, the average optical flow value of an object in the image sequence may advantageously facilitate the processor 206 to utilize the prediction filter 214, to robustly detect and track different objects that occlude, transform, translate, merge and split in successive frames of the image sequence.

The functions and operations executed by the image processing apparatus 102, as described in FIG. 1, may be executed by the processor 206, in conjunction with the optical flow generator 210, the rules engine 212, and the prediction filter 214. Other operations executed by the processor 206, the optical flow generator 210, the rules engine 212, and the prediction filter 214 are further described in detail, for example, in the FIGS. 3A, and 3B.

Figure 3A:
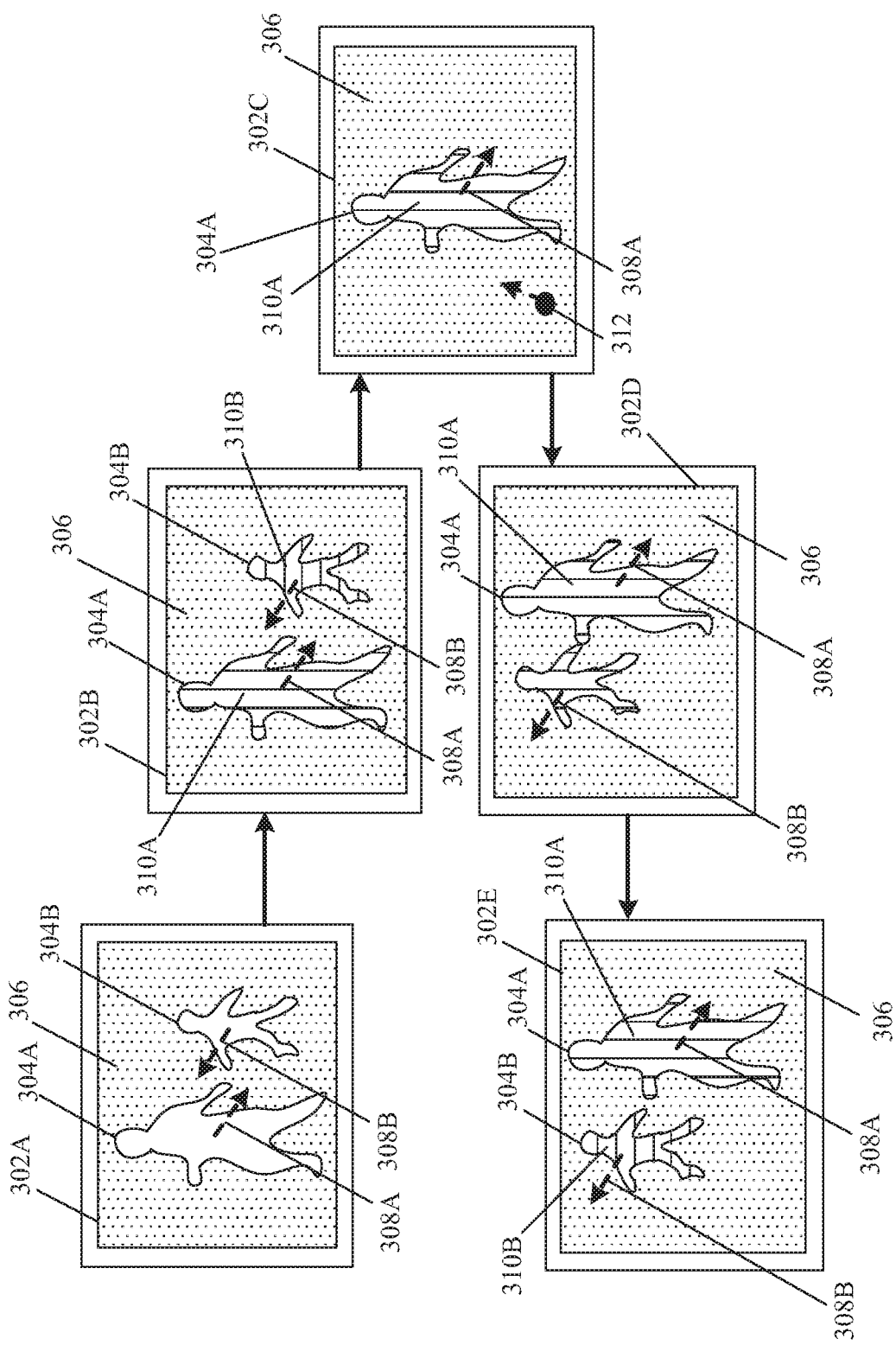
FIG. 3A illustrates an exemplary scenario and operations for detection and tracking of different objects engaged in motion in a captured image sequence, in accordance with an embodiment of the disclosure.

FIG. 3A is an example that illustrates different operations executed for detection and tracking of different objects engaged in motion in a captured image sequence, in accordance with an embodiment of the disclosure. FIG. 3A is described in conjunction with elements from FIGS. 1 and 2. In FIG. 3A, there is shown a first frame 302A of a scene presented at the display screen 204A. Such first frame 302A may be captured by the image processing apparatus 102, using the image sensor 216, as part of an image sequence (or a video).

As illustrated in FIG. 3A, the captured first frame 302A may include details of a scene prior to a detection of different moving objects in the scene, for example, a room with different users engaged in different activities. The captured first frame 302A may include a region 304A, and a region 304B as part of a foreground region and a background region 306 that may include different objects which remain stationary throughout different successive frames of the image sequence, for example, tables, chairs, lamps, and the like. The region 304A may be engaged in motion in a first direction 308A and the region 304B may be further engaged in motion in a second direction 308B such that the region 304A may cross the region 304B in a specific frame.

The processor 206 may be configured to generate, using the optical flow generator 210, an optical flow map that may at least capture motion of the region 304A and the region 304B, respectively. Such optical flow map may be generated based on the first frame 302A and preceding frames in the image sequence. Alternatively stated, the optical flow map may be generated based on computation of an apparent velocity and direction of every pixel in the first frame 302A with respect to previous frame from the image sequence.

The processor 206 may be further configured to label, using the rules engine 212, each detected moving region with a unique identifier. For example, a second frame 302B may include the region 304A and the region 304B labelled with a first unique identifier 310A and a second unique identifier 310B, respectively. Accordingly, the pixels in the region 304A and the region 304B may change (or get displaced) from the pixels in the background region 306 (which may remain unchanged in successive frames). Therefore, the processor 206 may be further configured to label, using the rules engine 212, the background region 306 with a unique identifier different from the first unique identifier 310A and the second unique identifier 310B. The unique identifier for the background region may be analyzed to segregate the region 304A and the region 304B (or the foreground region) from the background region, throughout successive frames of the image sequence. In aforementioned scenario, the position of the image sensor 216 (or the image processing apparatus 102) may be assumed to be constant. Therefore, the background 316 may be considered static in the image sequence.

In a third frame 302C, the region 304A may cross the region 304B such that the region 304A may occlude the region 304B. In some cases, the region 304A may partially occlude the region 304B. Additionally, a new region 312 may be further detected in the third frame 302C, which may exhibit an abrupt disappearance in subsequent frames of the image sequence. Therefore, the processor 206 may be configured to identify only the region 304A in the third frame 302C and further discard the optical flow caused by the newly detected region 312, without any assignment of a new label to the region 312.

In a fourth frame 302D, a region may reappear from the region 304A (as shown in the third frame 302C). In such scenario, the processor 206 may be configured to, predict, using the prediction filter 214, the temporal information associated with the region 304A and the region 304B (of the second frame 302B). Such region 304A and the region 304B may be further inferred as an object 304A and an object 304B in successive frames of the image sequence. The processor 206 may determine, using the prediction filter 214, a location of the object 304A and the object 304B in successive frames based on the derived temporal information for the object 304A and the object 304B, respectively. Alternatively stated, the processor 206 may be configured to compute, using the prediction filter 214, a velocity, an acceleration, and a centroid of the object 304A and the object 304B in successive frames of the image sequence.

The processor 206 may be further configured to generate, using the prediction filter 214, a trajectory of the detected object 304A and the object 304B based on the determined location, the computed velocity, the acceleration and the centroid for the object 304A and the object 304B, respectively. Such trajectory may be modelled based on a state space model of the temporal information of an estimated centroid of each of the object 304A and the object 304B within the captured image sequence. The trajectory of each of the detected moving objects 312, 314 may be assumed to be constant for few frames within the captured plurality of frames. The temporal information utilized to model the trajectory may include a location, a velocity and an acceleration, a size, and an average value of optical flow of the object 304A and the object 304B within the captured image sequence. In some embodiments, the acceleration of the object 304A and the object 304B may be assumed to be constant (or linear velocity) throughout the captured image sequence. In other embodiments, the acceleration of the object 304A and the object 304B may be assumed to be variable (or non-linear velocity) throughout the captured image sequence.

The processor 206 may be configured to predict, using the prediction filter 214, the location of the object 304A and the object 304B based on the modelled trajectory for the object 304A and the object 304B in successive frames of the image sequence. In the fourth frame 302D, the object 304A may be just at a point of separation from the object 304B along the first direction 308A and the second direction 308B, respectively. Thus, the processor 206 may be configured to identify the region that reappears from the object 304A in the fourth frame 302D as a single object. Such single object may be labelled with the first unique identifier which is same as the unique identifier for the object 304A (or the object that is larger from the group of objects/regions). Alternatively stated, a new region that separates from a larger region (or object) may be assigned a label assigned to the larger object (or the object 304B).

In the fifth frame 302E, a region may separate from the object 304A. In such scenario, the processor 206 may be configured to identify the temporal information (for example, a location, a velocity, or an acceleration) of the separated region from the object 304A. The processor 206 may be configured to check, using the prediction filter 214, whether the identified temporal information for the separated region matches with the predicted temporal information for the object 304B. In one instance, as illustrated in the fifth frame 302E, when the identified temporal information for the separated region matches with the predicted temporal information for the object 304B, the separated region may be assigned the unique identifier of the previously detected (and occluded) object 304B. In another instance, (not illustrated) when the identified temporal information for the separated region doesn't match with the predicted temporal information for the object 304B, the separated region may be identified by a new identifier and also as a new object. Therefore, the processor 206 may advantageously detect, using the prediction filter 214, different objects (for example, the object 304B) in successive frame of the image sequence even when the object 304A gets occluded by the object 304A in successive frames of the image sequence.

In accordance with an embodiment, the processor 206 may be further configured to measure, using the prediction filter 214, a deviation in the predicted location of the object 304A and the object 304B from the computed location of the object 304A and the object 304B. Such deviation may be measured based on a shift of the plurality of pixels between consecutive frames of the image sequence. The processor 206 may be further configured to calibrate, using the prediction filter 214, the predicted location of the object 304A and the object 304B based on the measured deviation. The calibration of the location of the object 304A and the object 304B may be done based on compensation of a threshold for the difference in the actual location and the predicted location for the object 304A and the object 304B. Thus, the difference between the actual location and predicted location of the object 304A and the object 304B may lie within a threshold value, which may correspond to a calibrated location of the object 304A and the object 304B.

It may be noted that the processor 206 may generate, using the optical flow generator 210, the optical flow map based on a comparison of at least two frames of the image sequence, such as the first frame 302A and a previous frame. However, for objects that move faster or move significantly with respect to a time difference between two successive frames, the image processing apparatus 102 may be configured to capture the image sequence at a higher frame rate that captures much more motion information than what is captured at a lower frame rate, for example, an image sequence captured at a frame rate of "60 frame per second (FPS)" may capture more granular motion information of the object 304A and the object 304B as compared to another image sequence captured at a frame rate of "30 FPS". Such adaptive control (or configuration) may advantageously facilitate the processor 206 to estimate granular motion information and predict granular motion updates, in near real time or real time.

Figure 3B:
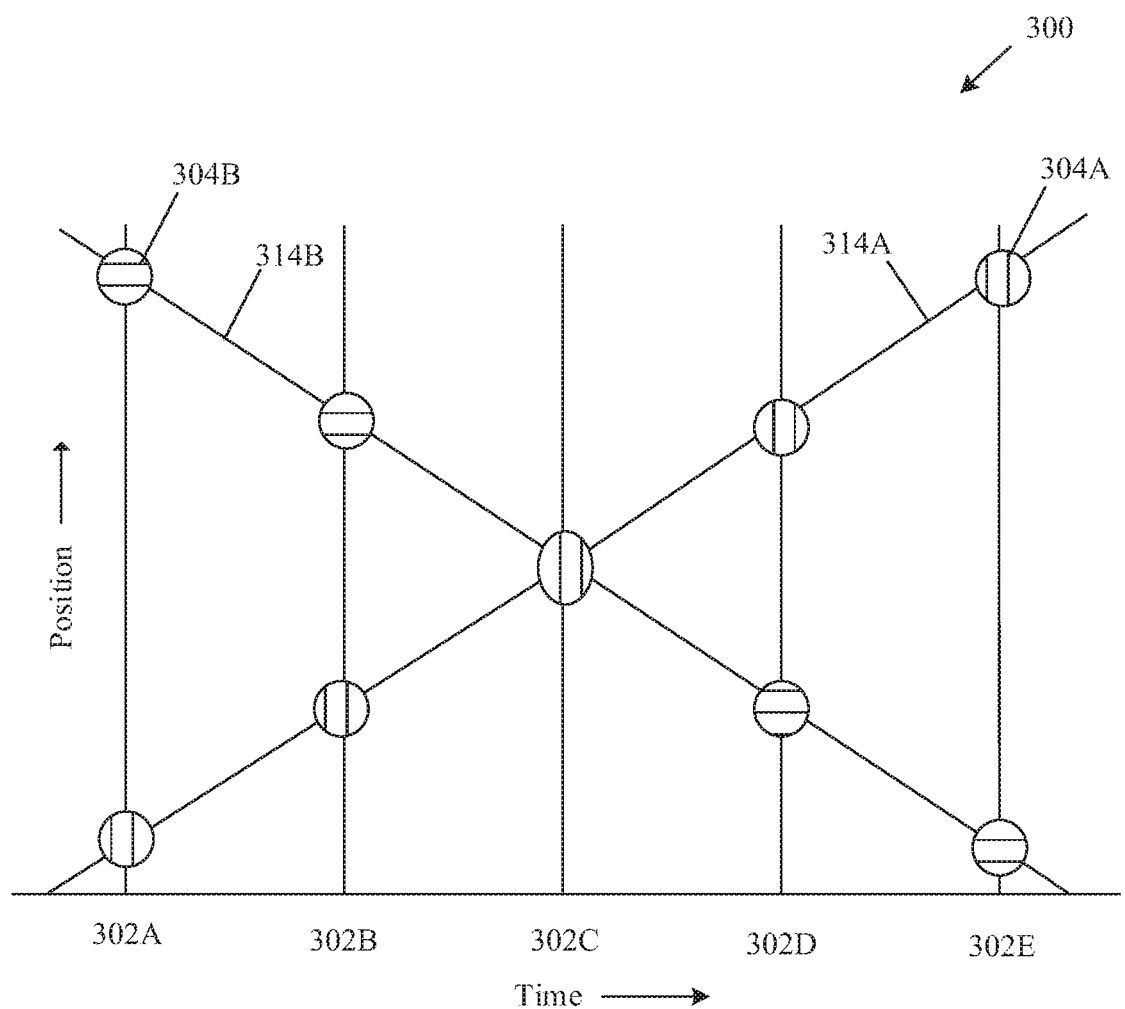
FIG. 3B is a graph that illustrates different stages of operations executed for prediction of temporal information of different objects engaged in motion in a captured image sequence, in accordance with an embodiment of the disclosure.

FIG. 3B is a graph that illustrates different stages of operations executed for prediction of temporal information of different objects engaged in motion in a captured image sequence, in accordance with an embodiment of the disclosure. FIG. 3B is described in conjunction with elements from FIGS. 1, 2, and 3A. With reference to FIG. 3B, there is shown a graph 300 that describes changes in a location of the object 304A and the object 304B (of FIG. 3A) in a set of frames 302A to 302E of the image sequence.

The processor 206 may be configured to track using the prediction filter 214, the plurality of moving objects (such as the object 304A and the object 304B) in the image sequence. The plurality of moving objects may be tracked based on a trajectory of each of the detected plurality of moving regions (such as the region 304A and the region 304B) that includes the identified plurality of merged objects and the identified plurality of split objects. For example, the object 304A may be tracked based on a trajectory 314A which is a straight line and a trajectory 314B which is also a straight line. Alternatively stated, the object 304A may be engaged in motion along the first direction 308A and the object 304B may be engaged in motion along the second direction 308B in the set of frames 302A to 302E.

In the first frame 302A of the set of frames 302A to 302E, the location of the object 304A and the object 304B may be detected by the processor 206, using the optical flow generator 210. The object 304A and the object 304B may be thus labelled with the first unique identifier 310A and the second unique identifier 310B, respectively. For example, the first unique identifier 310A may be a first color value of the pixels in the region of the object 304A and similarly, the second unique identifier 310B may be a second color value of the pixels in the region of the object 304B.

The processor 206 may compute, using the prediction filter 214, temporal information of the object 304A and the object 304B in the first frame 302A. The temporal information may include a location, a velocity and an acceleration, a size, and an average value of optical flow of the object 304A and the object 304B, respectively. Similarly, the temporal information of the object 304A and the object 304B may be computed for each frame of the set of frames 302A to 302E. The object 304A and the object 304B may approach each other based on the computed temporal information for the object 304A and the object 304B. In the third frame, as the object 304A may be larger than the object 304B in size, the region of the object 304B may merge with the region occupied by the object 304A. In such case, the processor 206 may label the merged object in the third frame 302C with the unique identifier for the larger object of the two object that merged in the third frame 302C. In other words, the merged object in the third frame 302C may be labelled with the first unique identifier (or the first color value) which is same as the color value for the object 304A.

In the fourth frame 302D, the merged object may split into two objects and may follow the trajectory 314A and the trajectory 314B, respectively, which may be the same as a trajectory predicted for the object 304A and the object 304B, respectively. Similarly, in fifth frame 302E, the object 304A may be uniquely identified with reference to the object 304B and thus, the object 304A and the object 304B may be tracked accurately, using the Prediction filter 214.

Figure 4A:
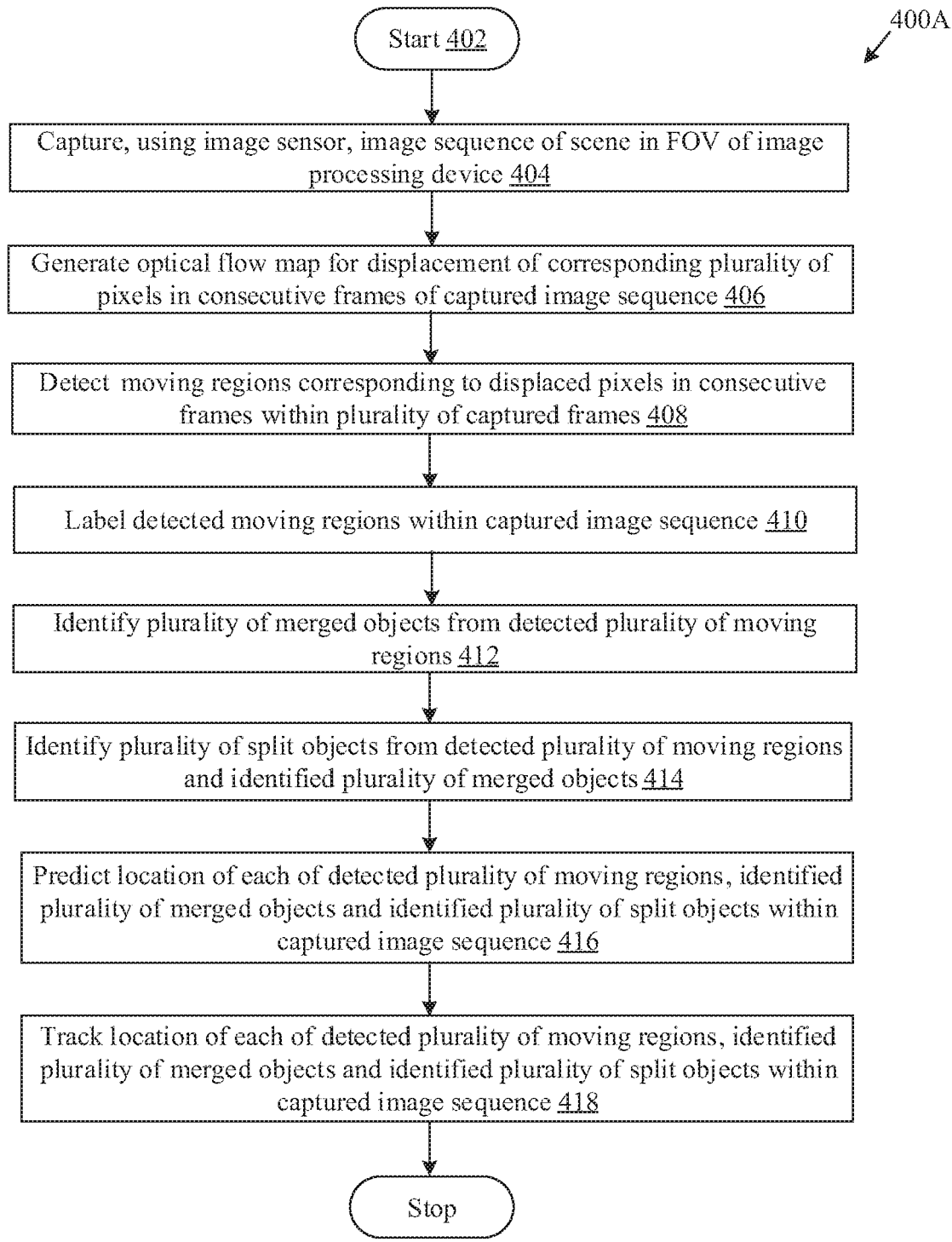
FIG. 4A is a flowchart that illustrates a method for detection and tracking of different objects engaged in motion in successive frame of an image sequence, in accordance with an embodiment of the disclosure.

FIG. 4A is a flowchart that illustrates a method for detection and tracking of different objects engaged in motion in successive frame of an image sequence, in accordance with an embodiment of the disclosure. FIG. 4A is explained in conjunction with FIG. 1, FIG. 2, FIG. 3A, and FIG. 3B. With reference to FIG. 4A, there is shown a flowchart 400A. The flowchart 400A is described in conjunction with FIGS. 1 and 2. The method starts at step 402 and proceeds to step 404.

At 404, an image sequence of a scene in a FOV of the image processing apparatus 102 may be captured. The image processing apparatus 102 may be configured to capture using the image sensor 216, the image sequence of a scene in the FOV of the image processing apparatus 102.

At step 406, an optical flow map may be generated for the displacement of a plurality of pixels in the consecutive frames of captured image sequence. The processor 206 may be configured to generate, using the optical flow generator 210, an optical flow map for the displacement of a plurality of pixels in the consecutive frames of captured image sequence. Such optical flow may determine the distribution of apparent velocities of movement of brightness patterns in a frame. The apparent velocities may arise from motion of a plurality of objects in the image sequence captured by the image processing apparatus 102. The motion of different objects may generate the optical flow as the image processing apparatus 102 may be configured in a stationary position.

At 408, a plurality of moving regions may be detected corresponding to displaced pixels in consecutive frames of the captured image sequence. The processor 206 may be configured to detect, using the optical flow generator 210, the plurality of moving regions corresponding to the displaced pixels in the consecutive frames of the image sequence. The optical flow map may be utilized to separate the plurality of moving regions from the non-moving regions.

At 410, the detected plurality of moving regions may be labelled in the image sequence. The image processing apparatus 102 may be configured to label the detected plurality of moving regions in the image sequence. In accordance with an embodiment, the plurality of moving regions may be divided into groups of pixels based on similar pixel intensity value. Different objects in a moving region may correspond to pixels which may share similar pixel intensity value and therefore, each of the plurality of objects may be associated a grouping region based on the pixel intensity value. In accordance with an embodiment, the plurality of objects may be assigned a unique indicator, such as a gray color as part of color labels. Each of the moving region may be labelled with a different color. In accordance with an embodiment, the moving regions may be represented by different colors to differentiate between the objects after such plurality of objects cross each other or reappear post occlusion.

At 412, a plurality of merged objects may be identified from the detected plurality of moving regions. The processor 206 may be configured to identify, using the rules engine 212, the plurality of merged objects from the detected plurality of moving regions. In accordance with an embodiment, the at least two moving objects may be monitored that remain in a first moving region for a defined number of frames. The at least two moving objects may be grouped in the first moving region of the plurality of moving regions as a first merged object. In accordance with an embodiment, when two objects merge into a moving region (merged object), the object label for the object with larger size may be kept. In accordance with an embodiment, each merged object from the plurality of merged objects may be discarded that abruptly splits from a first moving region of the plurality of moving regions and remerges with the first moving region within a defined number of frames in the image sequence. In an exemplary embodiment, the object that may occasionally leave the merged region (e.g. a new object appears and then disappears after 2 frames) should be discarded or be merged with other objects. In accordance with an embodiment, the objects which split from other object may be merged with the same object. In accordance with an embodiment, a first merged object identified previously in one moving region of a current frame may be discarded, when a size of the first merged object changes from a first size in the current frame to a second size in successive frames in the image sequence. The second size may be beyond a threshold change-limit.

At 414, a plurality of split objects may be identified from the detected plurality of moving regions and the identified plurality of merged objects. The processor 206 may be configured to identify, using the rules engine 212, the plurality of split objects from the detected plurality of moving regions and the identified plurality of merged objects. Each of the plurality of split objects may correspond to a moving object that splits from a detected moving region. When two objects may have crossed each other or when one object may have come out of the occlusion from another object, the merged object may split into multiple moving regions that may correspond to multiple fragments. When the moving regions split, the largest fragment may keep the object label and the smaller fragments may be assigned unique identifiers of new objects.

At 416, a location may be predicted for each of the detected plurality of moving regions, the identified plurality of merged objects and the identified plurality of split objects from the captured image sequence. The processor 206 may be configured to predict, using the prediction filter 214, the location for each of the detected plurality of moving regions, the identified plurality of merged objects and the identified plurality of split objects from the captured image sequence. The location may be based on a modelled trajectory of each of the detected plurality of moving objects, the identified plurality of merged objects and the identified plurality of split objects within the captured plurality of frames. The trajectory may be modelled on a state space model of temporal information of an estimated centroid of each of the detected plurality of moving regions, the identified plurality of merged objects and the identified plurality of split objects within the captured plurality of frames. The temporal information may comprise a corresponding location, a velocity and an acceleration, a size, and an average value of optical flow of each of the detected plurality of moving objects, the identified plurality of merged objects and the identified plurality of split objects within the captured plurality of frames.

At 418, a location may be tracked for each of the detected plurality of moving regions, the identified plurality of merged objects and the identified plurality of split objects within the captured image sequence. The processor 206 may be configured to track, using the prediction filter 214, the location for each of the detected plurality of moving regions, the identified plurality of merged objects and the identified plurality of split objects within the captured plurality of frames. Thereafter, the processor 206 may be further configured to measure, using the prediction filter 214, a deviation in the predicted location from the computed location of each of the detected plurality of moving regions, the identified plurality of merged objects and the identified plurality of split objects based on a shift of the plurality of pixels between consecutive frames of the captured plurality of frames. The predicted location of each of the detected plurality of moving regions, the identified plurality of merged objects and the identified plurality of split objects may be further calibrated based on the measured deviation. The calibration of the location of the objects may be done by fixing a threshold for the difference actual location and the predicted location. The difference between the actual location and predicted location of the object within a threshold value may correspond to a calibrated location of the predicted object. The control passes to end.

Figure 4B:
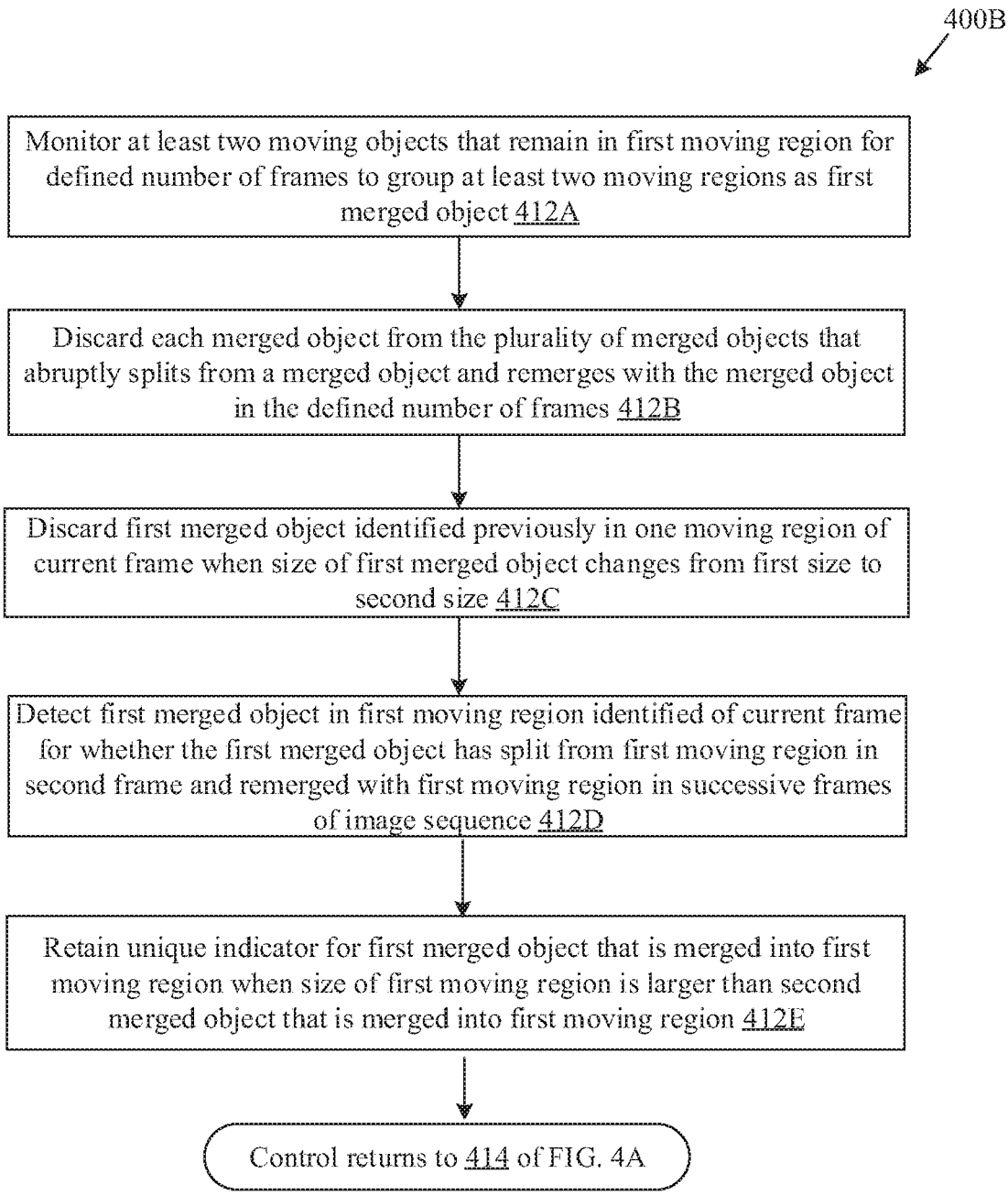
FIG. 4B is a flowchart that illustrates identification of merged objects from a plurality of moving regions in an image sequence, in accordance with an embodiment of the disclosure.

FIG. 4B is a flowchart that illustrates identification of merged objects from a plurality of moving regions in an image sequence, in accordance with an embodiment of the disclosure. FIG. 4B is explained in conjunction with FIG. 1, FIG. 2, FIG. 3A, FIG. 3B, and FIG. 4A. With reference to FIG. 4B, there is shown a flow chart 400B that describes sub-steps or operations of 412 of flowchart 400A. The method starts at 412A.

At 412A, at least two moving objects that remain in a first moving region for a defined number of frames may be monitored. The processor 206 may be configured to monitor, using the rules engine 212, at least two moving objects that remain in a first moving region for a defined number of frames. Such moving objects may be grouped in the first moving region of the plurality of moving regions as a first merged object based on the monitored results for the at least two moving objects. In an exemplary embodiment, the objects which remain in the same moving region for long time (e.g. 10 frames) may be merged into one object. When the two objects merge, the object label for the object with larger size may be retained while the object with the smaller size may be assigned a new label or the label of the object with the larger size.

At 412B, each merged object may be discarded from the plurality of merged objects that abruptly splits from a merged object and remerges with the merged object in the defined number of frames. The processor 206 may be configured to discard, using the rules engine 212, each merged object may be discarded from the plurality of merged objects that abruptly splits from a merged object and remerges with the merged object in the defined number of frames.

At 412C, a first merged object identified previously in one moving region of a current frame, may be discarded when a size of the first merged object changes from a first size in the current frame to a second size in successive frames in the image sequence. The second size is beyond a threshold change-limit. The processor 206 may be configured to discard, using the rules engine 212, the first merged object identified previously in one moving region of a current frame when a size of the first merged object changes from a first size in the current frame to a second size in successive frames in the image sequence.

At 412D, a first merged object identified in a first moving region of a current frame may be detected for whether the first merged object has split from the first moving region in a second frame and remerged with the first moving region in successive frames of the image sequence. The processor 206 may be configured to detect, using the rules engine 212, a first merged object identified in a first moving region of a current frame based on whether the first merged object has split from the first moving region in a second frame and remerged with the first moving region in successive frames of the image sequence.

At 412E, a unique indicator for a first merged object that is merged into a first moving region of the plurality of moving regions is retained, when size of the first merged object is larger than size of a second merged object that is merged into a first moving region. The processor 206 may be configured to retain, using the rules engine 212, the unique indicator for a first merged object that is merged into a first moving region of the plurality of moving regions is retained, when size of the first merged object is larger than size of a second merged object that is merged into a first moving region. The control returns to 414 of FIG. 4A.

Figure 4C:
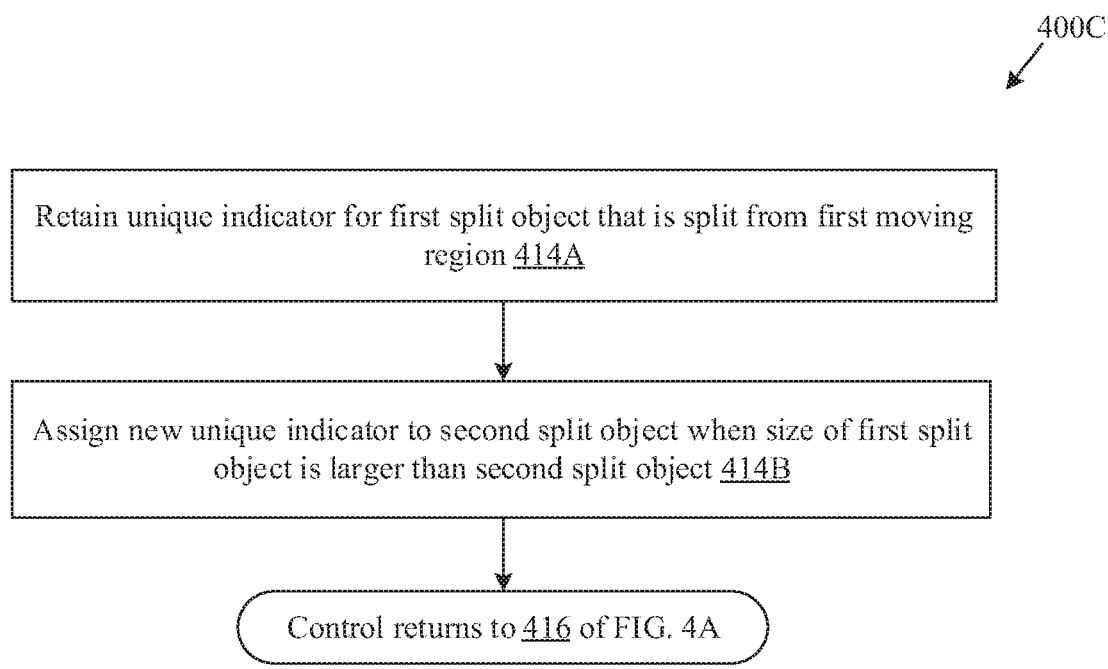
FIG. 4C is a flowchart that illustrates identification of split objects from a plurality of moving regions in an image sequence, in accordance with an embodiment of the disclosure.

FIG. 4C is a flowchart that illustrates identification of split objects from a plurality of moving regions in an image sequence, in accordance with an embodiment of the disclosure. FIG. 4C is explained in conjunction with FIG. 1, FIG. 2, FIG. 3A, FIG. 3B, FIG. 4A, and FIG. 4B. With reference to FIG. 4C, there is shown a flow chart 400C that describes sub-steps or operations of 414 of flowchart 400A. The method starts at 414A.

At 414A, a unique indicator may be retained for a first split object that may be split from a first moving region of the plurality of moving regions. The processor 206 may be configured to retain, using the rules engine 212, a unique indicator for a first split object that may be split from a first moving region of the plurality of moving regions. A new unique indicator may be assigned to a second split object that may be split from the first moving region when a size of the first split object may be larger than the second split object. In accordance with an embodiment, the first split object may be larger in size than the second split object and a new label may be assigned to the second split object.

At 414B, a new unique indicator may be assigned to the second split object when the size of first split object is larger than second split object. The processor 206 may be configured to assign, using the rules engine 212, a new label or unique indicator to the second split object. When more than two objects split, the first object may retain original label and other objects may be assigned new labels. The control returns to 416 of FIG. 4A.

Figure 4D:
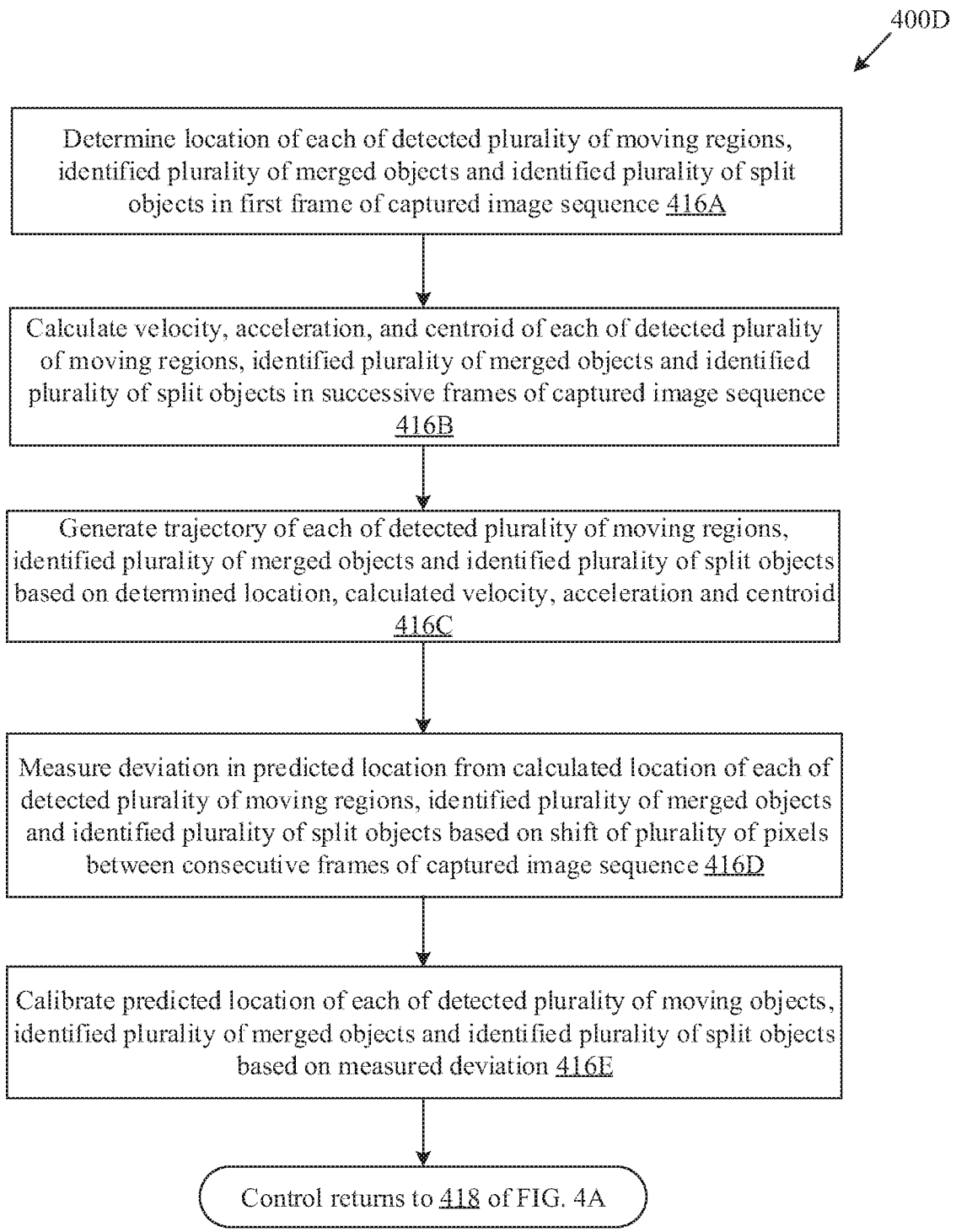
FIG. 4D is a flowchart that illustrates prediction of temporal information of different objects in an image sequence, in accordance with an embodiment of the disclosure.

FIG. 4D is a flowchart that illustrates prediction of temporal information of different objects in an image sequence, in accordance with an embodiment of the disclosure. FIG. 4D is explained in conjunction with FIG. 1, FIG. 2, FIG. 3A, FIG. 3B, FIG. 4A, FIG. 4B, and FIG. 4C. With reference to FIG. 4D, there is shown a flow chart 400D that describes sub-steps or operations of 316 of flowchart 400A. The method starts at 416A.

At 416A, a location of each of the detected plurality of moving regions, the identified plurality of merged objects and the identified plurality of split objects in a first frame of the captured plurality of frames may be determined. The processor 206 may be configured to determine, using the prediction filter 214, the location of each of the detected plurality of moving regions, the identified plurality of merged objects and the identified plurality of split objects in a first frame of the captured image sequence.

At 416B, a velocity, an acceleration, and a centroid of each of the detected plurality of moving regions, the identified plurality of merged objects and the identified plurality of split objects may be computed in the successive frames of the image sequence. The processor 206 may be configured to compute, using the prediction filter 214, a velocity, an acceleration, and a centroid of each of the detected plurality of moving regions, the identified plurality of merged objects and the identified plurality of split objects in the successive frames of the captured image sequence.

At 416C, a trajectory of each of the detected plurality of moving regions, the identified plurality of merged objects and the identified plurality of split objects may be generated based on the determined location, computed velocity, acceleration and the centroid. The processor 206 may be configured to generate, using the prediction filter 214, the trajectory of each of the detected plurality of moving regions, the identified plurality of merged objects and the identified plurality of split objects on the basis of determined location, the computed velocity, the acceleration and the centroid.

At 416D, a deviation in the predicted location from the computed location of each of the detected plurality of moving regions, the identified plurality of merged objects and the identified plurality of split objects may be measured based on a shift of the plurality of pixels between consecutive frames of the captured image sequence. The processor 206 may be configured to measure, using the prediction filter 214, a deviation in the predicted location from the computed location of each of the detected plurality of moving regions, the identified plurality of merged objects and the identified plurality of split objects. Such deviation may be measured based on a shift of the plurality of pixels between consecutive frames of the captured image sequence.

At 416E, the predicted location of each of the detected plurality of moving regions, the identified plurality of merged objects and the identified plurality of split objects may be calibrated based on the measured deviation. The processor 206 may be configured to calibrate, using the prediction filter 214, the predicted location of each of the detected plurality of moving regions, the identified plurality of merged objects and the identified plurality of split objects based on the measured deviation. The control returns to 418 of FIG. 4A.

The present disclosure provides numerous advantages over the conventional object tracking and camera technologies. The detection and tracking using a combination of the optical flow generator, the rules engine, and the prediction filter at the circuitry 200 facilitates faster computations and output with lower power consumption, as compared to conventional object detection systems that utilize significant power to detect and track objects. As the detection occurs for different occlusion states of objects at different motion profiles of the objects, the power consumption of the circuitry (or the image processing apparatus) is minimal and the integrity and the data throughput is maximized.

The use of optical flow maps for detection of multiple moving regions may advantageously facilitate segregation of a foreground region from a background region in successive frames of an image sequence. Post detection, different moving regions may be uniquely identified by a unique identifier (for example, a color label), which may advantageously facilitate generation and implementation of specific set of rules to detect and track different objects that split, merge, transform, abruptly move, scale, translate in successive frames of image sequence. Such specific set of rules may further facilitate prediction filters, such as the Kalman filter, to precisely model different states (temporal information) of different objects in successive frames. With precisely modelled states, the behavior as wells as different temporal parameters (for example, location, acceleration, velocity, average optical flow) may be advantageously tracked, predicted for successive frames, and calibrated to optimize tracking uncertainty.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An image processing apparatus, comprising:
   a memory device; and
   circuitry communicatively coupled to the memory device, wherein the circuitry is configured to:
     detect a plurality of moving regions in an image sequence;
     identify a plurality of first merged objects in the plurality of moving regions, wherein each of the plurality of first merged objects corresponds to at least two moving objects, of a plurality of moving objects, grouped in one moving region of the plurality of moving regions;
     discard a first merged object from the plurality of first merged objects, when the first merged object splits from a first moving region of the plurality of moving regions and remerges with the first moving region within a specific number of frames in the image sequence;
     identify a plurality of second merged objects based on the identified plurality of first merged objects and the discarded first merged object;
     identify a plurality of split objects from the plurality of moving regions and the identified plurality of second merged objects, wherein each of the plurality of split objects corresponds to a moving object, of the plurality of moving objects, that splits from one of a second moving region, of the plurality of moving regions, or the identified plurality of second merged objects; and
     track the plurality of moving objects in the image sequence, based on a trajectory of each of the detected plurality of moving regions that includes the identified plurality of second merged objects and the identified plurality of split objects.

2. The image processing apparatus according to claim 1, further comprises an image sensor, wherein the circuitry is further configured to capture the image sequence that includes the plurality of moving objects and at least one occluding object within a field-of-view of the image sensor.

3. The image processing apparatus according to claim 1, wherein the circuitry is further configured to detect the plurality of moving regions in the image sequence, based on an optical flow map of at least two consecutive frames of the image sequence.

4. The image processing apparatus according to claim 1, wherein the circuitry is further configured to generate an optical flow map based on a displacement of a plurality of pixels in at least two consecutive frames of the image sequence.

5. The image processing apparatus according to claim 1, wherein the circuitry is further configured to:
   compare a plurality of pixels of each of the detected plurality of moving regions in at least two consecutive frames of the image sequence; and
   identify at least one background region in the image sequence based on the compared plurality of pixels of each moving region of the detected plurality of moving regions in the at least two consecutive frames.

6. The image processing apparatus according to claim 1, wherein the circuitry is further configured to assign a unique indicator to each of the detected plurality of moving regions in the image sequence.

7. The image processing apparatus according to claim 1, wherein
   the circuitry is further configured to monitor the at least two moving objects that remain in a third moving region of the plurality of moving regions for the specific number of frames, and
   the at least two moving objects are grouped in the third moving region as a second merged object, of the plurality of second merged objects, based on the monitor of the at least two moving objects.

8. The image processing apparatus according to claim 1, wherein
   the circuitry is further configured to discard a second merged object identified previously in a third moving region of the plurality of moving regions of a current frame in the image sequence, when a size of the second merged object changes from a first size in the current frame to a second size in successive frames in the image sequence,
   the second size of the second merged object is greater than a threshold change-limit, and
   the plurality of first merged objects includes the second merged object.

9. The image processing apparatus according to claim 1, wherein
   the circuitry is further configured to detect whether a second merged object identified in a third moving region of a first frame of the image sequence has split from the third moving region in a second frame of the image sequence and remerged with the third moving region in successive frames of the image sequence;

the plurality of moving regions includes the third moving region, and the plurality of second merged objects includes the second merged object.

10. The image processing apparatus according to claim 1, wherein the circuitry is further configured to detect whether a second merged object identified in a third moving region of a first frame of the image sequence has split from the third moving region in a second frame of the image sequence and remerges with the third moving region in successive frames of the image sequence, the second merged object is identified as one of the plurality of second merged objects in the image sequence, and the plurality of moving regions includes the third moving region.

11. The image processing apparatus according to claim 1, wherein the circuitry is further configured to retain a unique indicator by a first split object that is split from the second moving region, a new unique indicator is assigned to a second split object that is split from the second moving region, when a size of the first split object is larger than a size of the second split object, and the plurality of split objects includes the first split object and the second split object.

12. The image processing apparatus according to claim 1, wherein the circuitry is further configured to:

determine a location of each of the detected plurality of moving regions, the identified plurality of second merged objects, and the identified plurality of split objects for a plurality of frames of the image sequence; and compute a velocity, an acceleration, and a centroid of each of the detected plurality of moving regions, the identified plurality of second merged objects, and the identified plurality of split objects for the plurality of frames of the image sequence.

13. The image processing apparatus according to claim 12, wherein the circuitry is further configured to model the trajectory of each of the detected plurality of moving regions, the identified plurality of second merged objects, and the identified plurality of split objects based on the determined location, the computed velocity, the computed acceleration, and the computed centroid.

14. The image processing apparatus according to claim 1, wherein the circuitry is further configured to model, based on a prediction filter, the trajectory of each of the detected plurality of moving regions including the identified plurality of second merged objects and the identified plurality of split objects, and the trajectory of each of the detected plurality of moving regions is modelled for the track of the plurality of moving objects in the image sequence.

15. The image processing apparatus according to claim 14, wherein the trajectory is modelled based on temporal information associated with each of the detected plurality of moving regions that includes the identified plurality of second merged objects and the identified plurality of split objects, and the temporal information comprises a location, a velocity and an acceleration, a size, and an average value of optical flow associated with each of the detected plurality of moving regions.

16. The image processing apparatus according to claim 1, wherein the circuitry is further configured to predict a location of the plurality of moving objects in the image sequence based on the identified plurality of second merged objects and the identified plurality of split objects in the image sequence.

17. The image processing apparatus according to claim 1, wherein the circuitry is further configured to predict a location of the plurality of moving objects in the image sequence based on the trajectory of the detected plurality of moving regions that comprises the identified plurality of second merged objects and the identified plurality of split objects in the image sequence.

18. The image processing apparatus according to claim 17, wherein the circuitry is further configured to measure a deviation in the predicted location from a location determined for each of the tracked plurality of moving objects, and the deviation in the predicted location is measured based on a shift of a plurality of pixels between consecutive frames of the image sequence.

19. The image processing apparatus according to claim 18, wherein the circuitry is further configured to calibrate the predicted location of each of the detected plurality of moving objects, the identified plurality of second merged objects and the identified plurality of split objects based on the measured deviation.

20. The image processing apparatus according to claim 1, wherein the circuitry is further configured to auto-focus on at least one of the tracked plurality of moving objects.

21. A method, comprising:

in an image processing apparatus that comprises a memory device and circuitry communicatively coupled to the memory device:

detecting, by the circuitry, a plurality of moving regions in an image sequence based on an optical flow map of at least two consecutive frames of the image sequence;

identifying, by the circuitry, a plurality of first merged objects in the plurality of moving regions, wherein each of the plurality of first merged objects corresponds to at least two moving objects, of a plurality of moving objects, grouped in one moving region of the plurality of moving regions;

discarding, by the circuitry, a specific merged object from the plurality of first merged objects, when the specific merged object splits from a first moving region of the plurality of moving regions and remerges with the first moving region within a specific number of frames in the image sequence;

identifying, by the circuitry, a plurality of second merged objects based on the identified plurality of first merged objects and the discarded specific merged object;

identifying, by the circuitry, a plurality of split objects from the plurality of moving regions and the identified plurality of second merged objects, wherein each of the plurality of split objects corresponds to a moving object, of the plurality of moving objects, that splits from one of a second moving region, of the plurality of moving regions, or the identified plurality of second merged objects; and tracking, by the circuitry, the plurality of moving objects in the image sequence, based on a trajectory of each of the detected plurality of moving regions that includes the identified plurality of second merged objects and the identified plurality of split objects.

\* \* \* \* \*